United States Patent
Newburn et al.

(10) Patent No.: US 9,063,804 B2
(45) Date of Patent: *Jun. 23, 2015

(54) SYSTEM TO PROFILE AND OPTIMIZE USER SOFTWARE IN A MANAGED RUN-TIME ENVIRONMENT

(71) Applicant: INTEL CORPORATION, Santa Clara, CA (US)

(72) Inventors: Chris J. Newburn, South Beloit, IL (US); Robert P. Knight, Mahomet, IL (US); Robert Y. Geva, Cupertino, CA (US); Dion Rodgers, Hillsboro, OR (US); Xiang Zou, Beaverton, OR (US); Hong Wang, Santa Clara, CA (US); Bryant E. Bigbee, Scottsdale, AZ (US); Ittai Anati, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/036,768

(22) Filed: Sep. 25, 2013

(65) Prior Publication Data

US 2014/0089942 A1    Mar. 27, 2014

Related U.S. Application Data

(63) Continuation of application No. 13/529,630, filed on Jun. 21, 2012, now Pat. No. 8,566,567, which is a continuation of application No. 11/233,741, filed on Sep. 23, 2005, now Pat. No. 8,301,868.

(51) Int. Cl.
*G06F 15/00* (2006.01)
*G06F 7/38* (2006.01)
*G06F 9/00* (2006.01)
*G06F 9/44* (2006.01)
*G06F 9/54* (2006.01)
*G06F 11/34* (2006.01)
*G06F 11/36* (2006.01)

(52) U.S. Cl.
CPC .............. *G06F 9/542* (2013.01); *G06F 11/348* (2013.01); *G06F 11/3612* (2013.01); *G06F 2201/86* (2013.01); *G06F 2201/885* (2013.01)

(58) Field of Classification Search
None
See application file for complete search history.

(56) References Cited

U.S. PATENT DOCUMENTS

| | | | |
|---|---|---|---|
| 5,862,366 A * | 1/1999 | Schmidt et al. | 703/21 |
| 6,018,759 A | 1/2000 | Doing et al. | |
| 7,185,185 B2 | 2/2007 | Joy et al. | |
| 2004/0163083 A1* | 8/2004 | Wang et al. | 718/102 |
| 2005/0132336 A1 | 6/2005 | Gotwals et al. | |
| 2005/0204349 A1 | 9/2005 | Lewis et al. | |

(Continued)

OTHER PUBLICATIONS

Zhao et al. (Ameliorating the Overhead of Dynamic Optimization, Dec. 2004, pp. 1-8).*

(Continued)

*Primary Examiner* — George Giroux
(74) *Attorney, Agent, or Firm* — Trop, Pruner & Hu, P.C.

(57) ABSTRACT

Method, apparatus, and system for monitoring performance within a processing resource, which may be used to modify user-level software. Some embodiments of the invention pertain to an architecture to allow a user to improve software running on a processing resources on a per-thread basis in real-time and without incurring significant processing overhead.

14 Claims, 7 Drawing Sheets

(56) References Cited

U.S. PATENT DOCUMENTS

| | | |
|---|---|---|
| 2005/0223371 A1 | 10/2005 | Nefian et al. |
| 2006/0037020 A1* | 2/2006 | Accapadi et al. ............. 718/102 |
| 2006/0265542 A1 | 11/2006 | Shen et al. |

OTHER PUBLICATIONS

Zhao, et al., "Ameliorating the Overhead of Dynamic Optimization," Dec. 2004, 8 pages.

* cited by examiner

SYSTEM TO PROFILE AND OPTIMIZE USER SOFTWARE IN A MANAGED RUN-TIME ENVIRONMENT

This application is a continuation of U.S. patent application Ser. No. 13/529,630, filed Jun. 21, 2012, which is a continuation of U.S. patent application Ser. No. 11/233,741, filed Sep. 23, 2005, now U.S. Pat. No. 8,301,868, the content of which is hereby incorporated by reference.

The present disclosure pertains to the field of processing apparatuses and systems that process sequences of instructions or the like, as well as certain instruction sequences to program such apparatuses and/or systems. Some embodiments relate to monitoring and/or responding to conditions or events within execution resources of such processing apparatuses.

DESCRIPTION OF RELATED ART

Various mechanisms are presently used to monitor and profile a software program activity, including instrumentation and system-level profiling. Software instrumentation is a technique that requires the modification of the software, either during compilation or while in post-compiled ("binary") form, by inserting codes at points where a developer would like to see the progress (e.g., output, processor state, etc.) of the software.

Instrumentation may be undesirable in certain circumstances, as instrumentation typically requires a non-trivial amount of code to be added to an instrumented program, which can result in significant performance overhead when executing the instrumented program. As a result, a delay may occur between the time when an event occurs and the time that the event is actually detected and associated with a particular operation within the code. This delay may make it difficult to accurately discern the operation or operations causing the event, which makes efforts to avoid or improve the event difficult, if not impossible. Lastly, instrumentation may be undesirable if it requires the instrumented program to be recompiled before the instrumented code is executed.

As a result, managed run-time environments, such as the Microsoft®.Net™ developer environment, may not typically support instrumentation for the development of production-quality software.

Although prior art system-level profiling techniques can be used to profile and optimize software during run-time, these techniques typically require a developer to use operating system functions (e.g., application program interface, or "API") to monitor or profile the user-level software, which may result in performance overhead. Accordingly, a user may not be able to obtain the true performance profile of a particular program and optimize his software accordingly due to the possible operating system-imposed time lag and lack of precision between when an event occurs within a processor executing his software and when an event is recorded and becomes visible through the profiling interface. Furthermore, typical system-level profiling techniques typically do not allow a developer to profile or optimize software on a per-thread basis.

Multi-threading is a technique by which processor hardware may be utilized by multiple different threads. Multi-threaded processors may switch between threads for a variety of reasons. For example, a processor may have an algorithm that automatically switches between available threads. Other processors use switch-on-event multithreading (SoEMT), whereby certain events such as a cache miss may give rise to a thread switch. Thread switching can be considered a change of control flow because the processor switches the sequence or stream which it executes.

In any case, system-level profiling techniques are typically not able to modify, profile, or optimize a particular thread or threads of a user-level program and may incur significant processing overhead, preventing a developer from optimizing user-level programs. Furthermore, prior art instrumentation techniques may not allow a developer to modify, profile, or optimize user-level programs during run-time, or may incur significant processing overhead, further exacerbating the problem of optimizing the user-level code.

BRIEF DESCRIPTION OF THE FIGURES

The present invention is illustrated by way of example and not limitation in the Figures of the accompanying drawings.

DETAILED DESCRIPTION

The following description describes embodiments of a system to profile and optimize user software in a managed run-time environment responsive to detection of one or more user-selected architecturally-defined processor conditions. In the following description, numerous specific details such as processor types, microarchitectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

In some embodiments, disclosed techniques may allow a program to actively monitor and respond to conditions of the execution resources which execute the program while executing the program. Effectively, such embodiments may incorporate real-time execution resource operating condition feedback to improve performance. If the execution resources encounter execution delaying conditions, the program execution may be disrupted to make adjustments. In some embodiments, a handler may be activated and may spawn a service thread to attempt to improve execution of the original thread. In other embodiments, the disruption may be accomplished by switching to another program thread that may not be a service thread. These and other embodiments may in some cases advantageously improve processing throughput and/or allow optimizations to be tailored to particular hardware.

Figure 1:
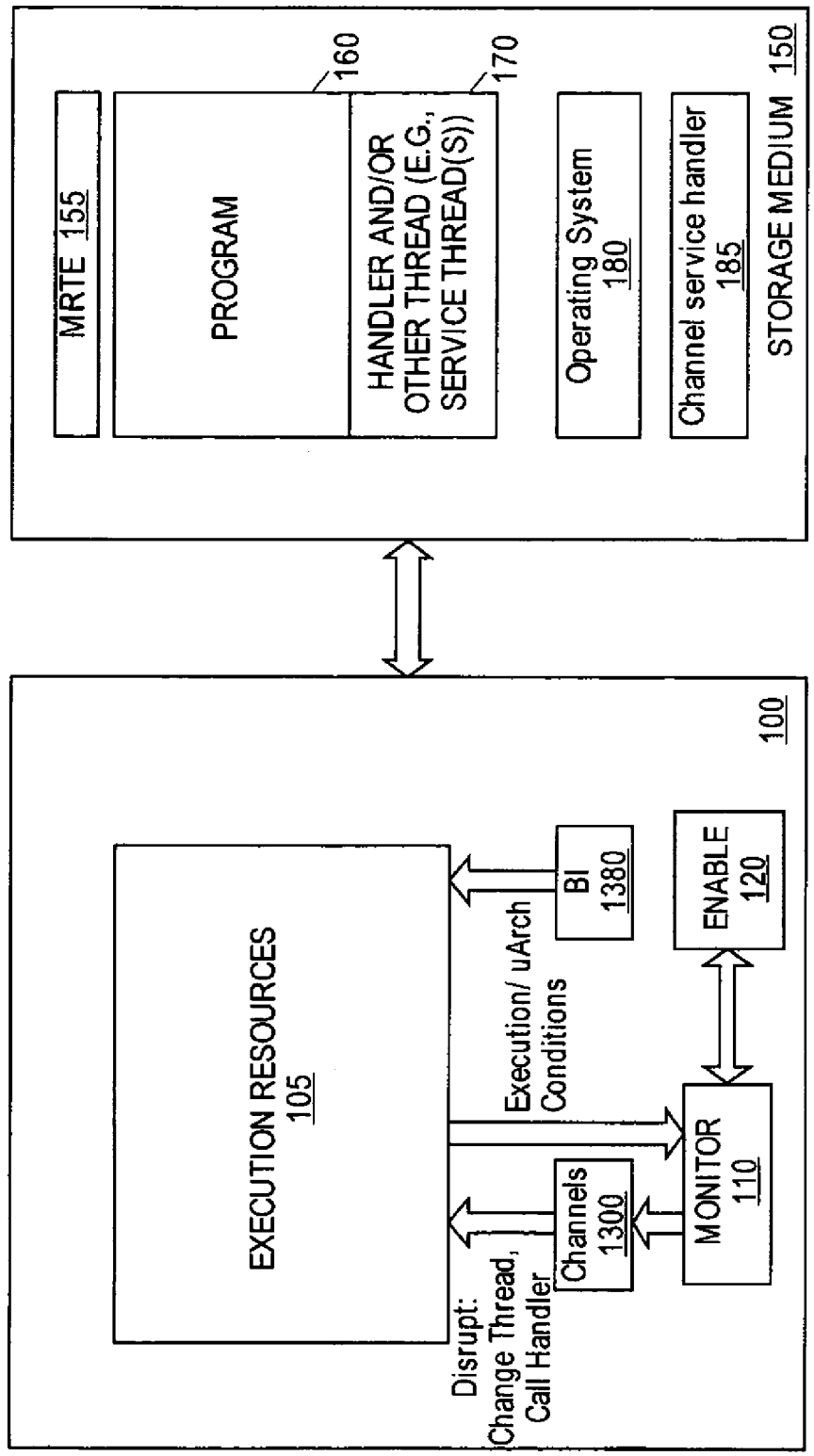
FIG. 1 illustrates one embodiment of a system to monitor various events within a processor.

Turning to FIG. 1, one embodiment of a system that can monitor conditions of execution resources is illustrated. In the embodiment of FIG. 1, execution resources 105, a monitor 110, and enable logic 120 form a portion of a processor 100 that is capable of executing instructions. The execution resources may include hardware resources that may be integrated into a single component or integrated circuit in some embodiments. However the execution resources may include software or firmware resources or any combination of hardware and software and/or firmware that may also be used in execution of program instructions. For example, firmware may be used as a part of an abstraction layer or may add functions to processing hardware, as may software. Software also may be used to emulate part or all of an instruction set or to otherwise assist in processing.

The processor may be any of a variety of different types of processors that execute instructions. For example, the processor may be a general purpose processor such as a processor in the Pentium® Processor Family or the Itanium® Processor Family or other processor families from Intel Corporation or other processors from other companies. Thus, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques. As integration trends continue and processors become even more complex, the need to monitor and react to internal performance indicators may further increase, thus making presently disclosed techniques more desirable. However, due to rapid technological advance in this area of technology, it is difficult to foresee all the applications of disclosed technology, though they may be widespread for complex hardware that executes program sequences.

As shown in FIG. 1, the processor 100 is coupled to a storage medium 150 such as a memory. The storage medium 150 may be a memory subsystem having various levels of hierarchy which may include but are not limited to various levels of cache memory, system memory such as dynamic random access memory or the like, and non-volatile storage such as flash memory (e.g. memory stick etc), a magnetic or optical disk. As illustrated, the storage medium stores a program 160 and a handler and/or other thread instructions such as instructions for a service thread 170. Furthermore, the memory may store a managed run-time environment 155 in which a program thread or threads may be developed and optimized in response to monitoring various events within the execution resources.

To allow the monitor 110 to monitor the desired events, the monitor 110 may be coupled to various portions of execution resources in order to detect particular conditions or to be informed of certain microarchitectural events. Signal lines may be routed to the monitor 110, or the monitor may be strategically placed with or integrated with relevant resources. The monitor 110 may include various programmable logic or software or firmware elements. For at least one embodiment, the monitor 110 may be programmed to monitor one or more architectural or microarchitectural events that are associated with architecturally-defined event combinations, or "scenarios", that may be used to trigger a yield event. Alternatively, the monitor 110 may be hardwired to detect a particular condition or set of conditions associated with a scenario.

Accordingly, the system illustrated in FIG. 1 may support one or more architectural events called yield events. The yield events transfer the execution from the currently running instruction stream to the channel's yield event service routine. The channel's service routine belongs to the same process/context of the currently running instruction stream. The yield event is signaled when the scenario associated with the channel triggers.

The monitor 110 tracks the various events or conditions, and if the events or conditions it is programmed to detect occur, then the execution resources 105 are signaled to disrupt the normal control flow the program would otherwise follow. As indicated in FIG. 1, the disruption may result in an event handler being called or a thread switch occurring. For at least one alternative embodiment, a disruption of the normal control flow of the program is not necessarily triggered if the events or conditions monitored by the monitor 110 occur. Instead, one or more of a group of architectural states, called channels 1300, may be utilized to indicate whether a yield event should occur when all conditions for a scenario are detected by the monitor 110. That is, the channel may be programmed so that, when a scenario is detected, a yield event will occur. Without such indication in the channel, the satisfaction of a scenario, though detected, may not cause a yield event.

The processor 100 illustrated in FIG. 1 thus includes a set of architecture states called channels 1300. Each channel specifies a trigger-action mapping. The trigger is the scenario that is associated with the channel. Response to occurrence of the scenario, a yield event handler may record the occurrence and respond by invoking a service routine, such as channel service handler 185 illustrated in FIG. 1. The yield event handler may be a hardware, firmware, or software mechanism.

In addition, at least one embodiment of the processor 100 may also include a yield block indicator ("BI"), 1380. The value of the BI 1380 may provide an override function. That is, the value of the BI 1380 indicates whether, despite a channel that indicates that a yield event should occur upon occurrence of a scenario, the yield event should not be taken. For at least one embodiment, the BI 1380 includes a field for each ring level of privilege. Thus, the BI 1380 may be a register or set of registers.

One example of a specific detectable condition is that data may be missing from a cache memory, resulting in the event of a cache miss occurring. In fact, a program may generate a pattern of memory accesses that causes repeated cache misses, thereby degrading performance. Such an occurrence of a certain number of cache misses within a period of time or during execution of a portion of code is one example of a scenario that indicates a relatively low level of progress is being made in executing that section of code. The monitor 110 may be programmed to monitor for and detect that this or other detectable conditions have occurred, or have occurred a certain number of times.

Other detectable events which may be low progress indicators may relate to various other microarchitectural or structural details of the execution resources. A monitor may detect a condition involving one or more of a stall of a resource, a cache event, a retirement event, a branch or branch prediction result, an exception, a bus event, or a variety of other commonly monitored or performance-impacting events or conditions. The monitor 110 may count or otherwise time, quantify, or characterize such events or conditions, and may be programmable when a particular metric associated with one or more events or conditions occurs. Furthermore, one or more events of detected by the monitor may be logically combined or accumulated to define a scenario or scenarios that may be triggered and detected to further provide performance feedback to allow a user to further optimize his or her user-level software programs on a per-thread basis at run-time.

FIG. 1 illustrates that the storage medium 150 may also include an operating system ("OS") 180 as well as the channel service handler mechanism 185. For at least one embodiment, the operating system 180 may be minimally involved in the user-level thread monitoring and optimization techniques described herein. For example, the OS 180 may be involved in saving and restoring contexts during yield event processing. The operating system 180 may thus provide context management services. The channel states may be part of the context that the OS 180 manages.

For at least one embodiment, however, the OS 180 is not involved with delivering the yield event. For such embodiment, the satisfaction of a programmed scenario (that is, a combination of events that have been programmed into a channel in order to trigger a yield event) triggers a yield event that is delivered via the yield event handler in hardware or firmware. For at least one embodiment, for example, the instruction triggering satisfaction of the scenario may be tagged, via hardware. Such tag may be processed in order to deliver the yield event. Such processing may occur, for example, in hardware or firmware, such as microcode ROM instructions, of the execution resources 105. This hardware or firmware mechanism that effects transfer of control for a yield event is sometimes referred to herein as the "yield event handler."

Control may be transferred, via the yield event handler, to the channel service handler 185. In this manner, processing for an architecturally-defined scenario may be performed directly by user-level code with minimal intervention of the OS 180. Scenario condition detection and yield event delivery (including control transfer) are transparent to the OS 180 for such an embodiment.

For at least one other embodiment, however, satisfaction of a scenario may trigger an internally-generated software interrupt rather than triggering a hardware-delivered yield event as discussed above. For such embodiment, the operating system 180 may invoke the channel service handler 185 when a yield event software interrupt occurs.

Regardless of how the yield event is delivered (hardware vs. software), the yield event may be handled by user-level code. That is, under either approach control may be transferred to the channel service handler 185, which may, in effect, transfer control to a user-defined service thread or handler responsive to detection of the trigger condition. This control transfer disrupts execution of the current instruction stream that was executing when the yield event occurred. The user-defined service thread or handler may include routines to optimize the threads that caused a scenario to be triggered, in one embodiment. Furthermore, in one embodiment, the user-defined service thread or handler may be used to optimize user-level programs causing a scenario trigger within a managed run-time environment, such that optimizations may be made in real-time.

Figure 2:
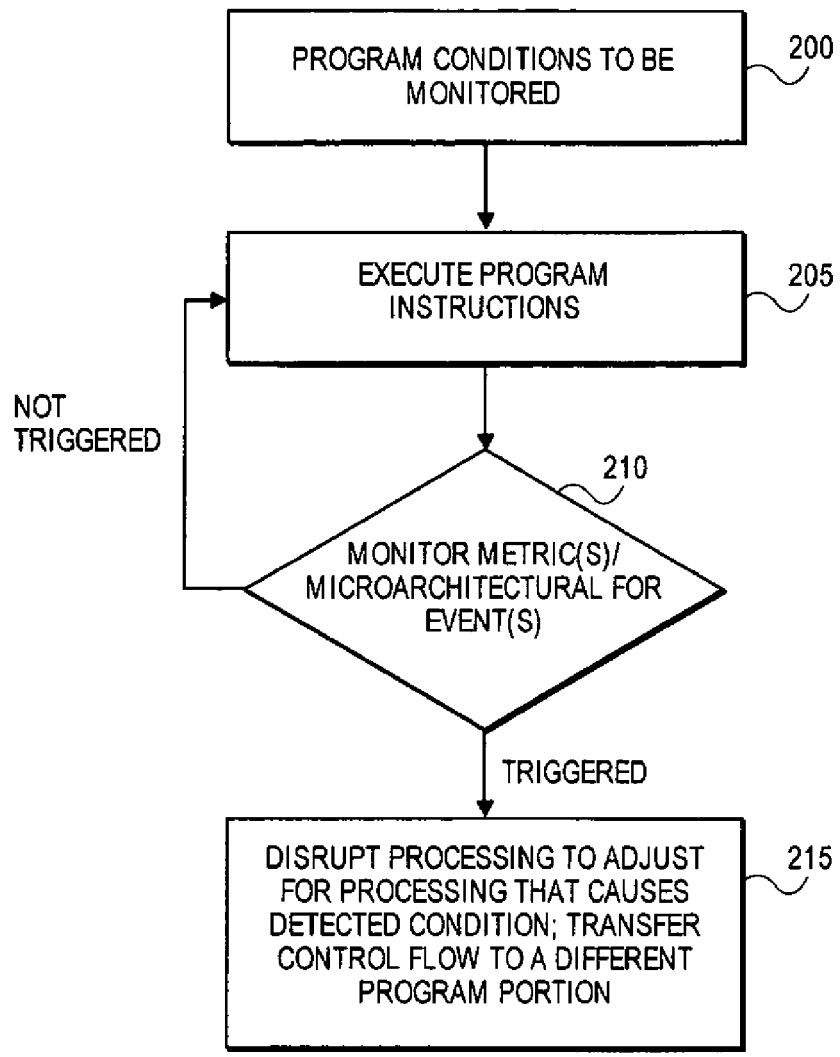
FIG. 2 illustrates a flow diagram of operations for one embodiment of the system of FIG. 1.
Figure 3:
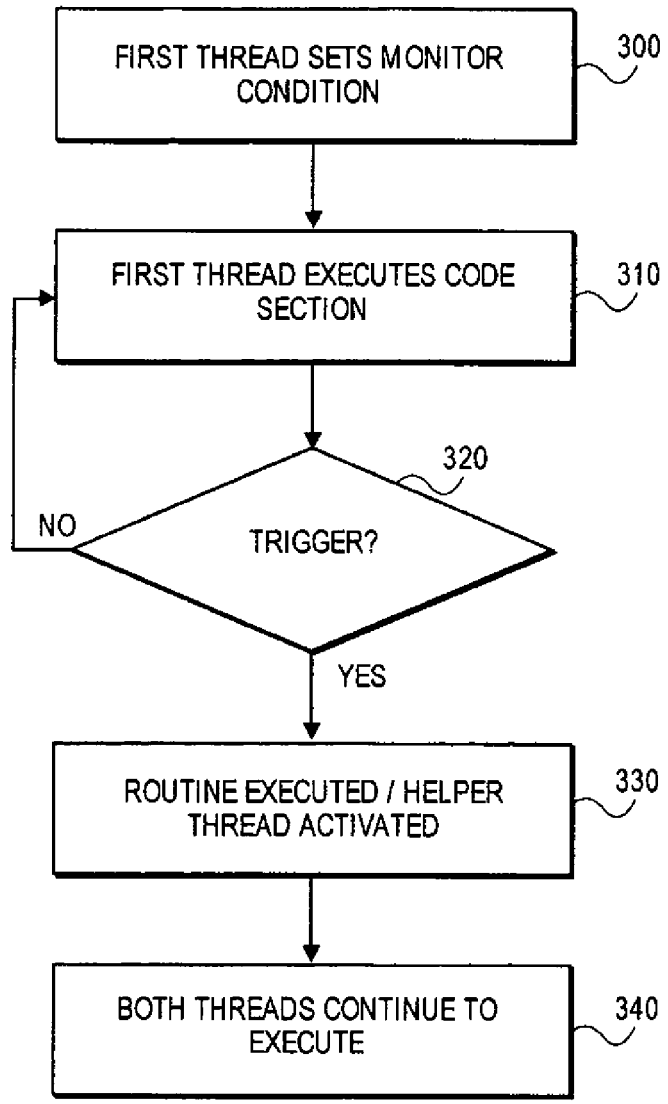
FIG. 3 illustrates a flow diagram of operations for another embodiment of the system of FIG. 1.

FIG. 2 illustrates a flow diagram of operations for one embodiment of the system of FIG. 1. As indicated in block 200 of FIG. 2, the program 160 may set events or scenarios to monitor within processing resources in which the program is being executed. For example, the enablement logic 120 may control both activation of the monitor and which event(s) to detect. Accordingly, at block 200 the program 160 may invoke the enablement logic 120 to activate the monitor 110 to detect one or more microarchitectural or architectural processor events or scenarios. Alternatively, the enablement logic 120 may enable and/or mask events, and the monitor 110 may itself also be programmable for further flexibility in specifying the events or conditions within the execution resources or system that are tracked. In either case, the program 160 itself may specify conditions that are to be watched during its own execution.

For example, the program 160 may be a program that includes a main thread that invokes the enablement logic 120 to indicate that the monitor 110 should monitor for a particular scenario. The scenario may include a single "raw event" or, alternatively, may be a composite scenario that includes two or more raw events. For at least one other embodiment, however, the hardware of the monitor 110 is dedicated, or "hardwired", to monitor for certain raw events.

The program 160 may also, at block 200, modify one or more of the channels 1300 to indicate the handler or thread 170 which is to be activated when the monitored condition(s) occur. For example, the program 160 may be a program which includes a main thread and a service thread or service routine that attempts to improve execution of the main thread if conditions the program specifies occur. The main thread may include an EMONITOR-type instruction (discussed below) to map a handler to the monitored condition(s).

As indicated in block 205, the program instructions are executed. Execution of the program causes the state of the execution resources to change. For example, a variety of conditions may occur or be present that inhibit forward progress in execution of the program. As indicated in block 210, the various processing metrics and/or microarchitectural conditions may be monitored to determine if the triggering event programmed in block 200 occurs. If the triggering state does not occur in block 210, disruption of processing is not triggered, and program execution continues by returning to block 205.

In some cases, the triggering state bears only an indirect relationship to execution of any single instruction. For example, a prior art instrumentation technique typically causes a break when an instruction pointer reaches a designed address. Such breakpoints are precise because a particular instruction (i.e., its address) directly triggers the break. Also, the prior art quiesce instruction itself causes a thread to stop at least temporarily. In contrast, some embodiments utilizing disclosed techniques trigger control flow changes on a set of conditions that are not necessarily caused by a single instruction, but rather may be caused by the overall program flow and/or system environment. Thus, while the monitor may repeatedly trigger at the same instruction execution state in a single system, other conditions, environments, system, etc., may cause different trigger points for the same program. In this sense, disclosed techniques, in some cases, provide an imprecise or asynchronous mechanism generating a control flow change that is not directly tied to an instruction execution boundary. Moreover, such an imprecise mechanism may, in some embodiments, test for events at a less fine granularity than each instruction and/or may delay recognition of events for some period of time because architectural correctness does not depend on any processing-rate-enhancing service routines executing at any particular point in time.

When a single or composite set of conditions associated with a scenario is detected by the monitor in block 210, processing of the program may be disrupted as indicated in block 215. Whether or not disruption 215 occurs is governed by the current contents of the channels 1300. If the detected scenario has been mapped to a handler or other thread 170, then disruption processing 215 may be executed. If a channel indicates that such disruption should be triggered, processing proceeds to block 215. Otherwise, processing loops back to block 205.

Generally, at block 215 the system may responsively adjust because processing of the program is occurring inefficiently or in a manner other than the manner the programmer desired. For example, another software routine such as another program portion may be invoked. The other program portion may be another thread unrelated to the original thread or may be a service thread that helps ("helper thread") execute the original thread, for example by prefetching data to reduce cache misses. Alternatively, a program-transparent (e.g., hardware) mechanism may perform some optimizations, reconfiguration (including, but not limited to reconfiguration of the monitor setup), reallocation of resources or the like to hopefully improve processing.

Figure 4:
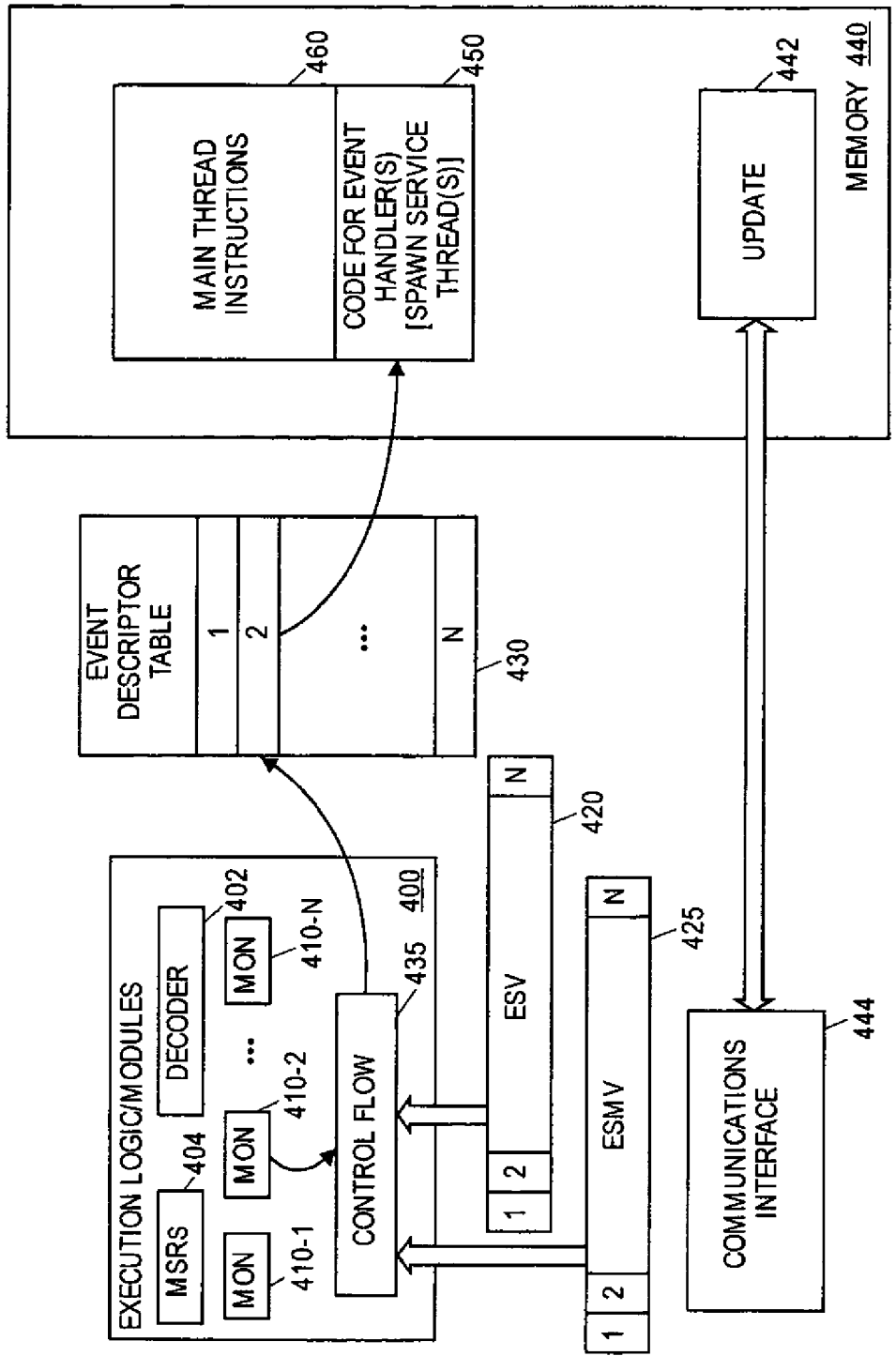
FIG. 4 illustrates another embodiment of a system that can respond to multiple different performance events and/or to composite performance events.

FIG. 4 illustrates another embodiment of a system that can respond to multiple different performance events and/or to composite performance events (e.g., scenarios). In the embodiment of FIG. 4, execution resources 400 are shown as including a set of N monitors 410-1 through 410-N. Additionally, an event schema vector (ESV) storage location 420 and an event schema vector mask (ESVM) storage location 425 are provided. The embodiment of FIG. 4 shows a number of monitors (N) corresponding to the number of bits in the event schema vector and the event schema mask vector. In other embodiments, there may be different numbers of monitors and bits in these vectors, and the monitors may or may not correlate directly to the bits. For example, a condition involving multiple monitors may correlate to a single vector bit in some embodiments.

The execution resources 400 are optionally coupled to an event descriptor table 430 (EDT), which may be locally implemented on the processor or in a co-processor or system memory. Control flow logic 435 is coupled the monitors 410-1 through 410-N and to receive values from the event schema vector and the event schema vector mask. The control flow logic 435 changes the control flow for processing logic when a condition detected by one or more of the monitors is enabled according to the event schema vector and event schema vector mask.

The embodiment of FIG. 4 also illustrates decode logic 402 and a set of machine or model specific registers 404 (MSRs). Either or both of the decode logic 402 and the model specific registers may be used to program and/or activate the monitors and the event schema vector and mask. For example, MSRs may be used to program the types or number of events that trigger the monitors. MSRs may also be used to program the event schema vector and mask. Alternatively, one or more new dedicated instruction(s) to be decoded by the decoder 402 may be used for either or both of programming the monitors and the event schema vector and mask. For example, a yield instruction (such as an embodiment of the EMONITOR instruction discussed below) may be used to enable disruption of processing a program when a certain set of conditions occurs. Some or all of the conditions may be specified by an operand to the yield instruction or otherwise programmed in advance of its execution. Such a yield instruction may be decoded by the decoder 402 to trigger a microcode routine, to produce a corresponding micro-operation or micro-instruction, or sequences of micro-operations to directly signal appropriate logic, or activate a co-processor or to otherwise implement the yield functionality. The concept of yielding may appropriately describe the instruction in some embodiments in which one thread is allowed to continue after executing the yield instruction but may be slowed at some point by execution of another thread or handler. For example, a largely single-threaded program may invoke extra service threads and share the processor with those extra service threads.

In the embodiment of FIG. 4, a memory 440 includes event handler code 450 and a set of main thread instructions 460. In some embodiments, the event descriptor table may be stored in the same memory or in the same memory hierarchy as the main thread instructions 460 and handler code 450. As previously discussed, execution of code for the handler(s) may spawn a service thread to assist the main program in executing efficiently.

The memory 440 may also store an update module 442 to communicate via a communications interface 444. The update module 442 may be a hardware module or a software routine executed by the execution resources to obtain new conditions to be programmed into various monitors and/or enablement logic. The update module 442 may also obtain new service threads or routines. For example, these may be downloaded by a software program from the vendor of the software program to provide enhanced performance. Thus, the network interface 444 may be any network and/or communication interface that allows information transfer via a communication channel. In some cases, the network interface may interface to the internet to download new conditions and/or service routines or threads.

In one embodiment, each bit of the event schema vector indicates the occurrence or non-occurrence of a particular event, with the particular event possibly being a composite event reflective of (and/or expressed via Boolean operations in terms of) a variety of conditions or other events, such as a scenario. Occurrence of the particular event may set the bit in the event schema vector. Each bit in the event schema vector may have a corresponding bit in the event schema mask vector. If the mask bit indicates that the particular event is masked, then the control flow logic 435 may disregard the event, although the bit in the event schema vector may remain set due to its occurrence. The user may choose whether to clear the event schema vector when unmasking events. Thus, an event may be masked for some time and handled later. In some embodiments, the user may choose to specify the trigger as a level trigger or an edge trigger, depending upon various issues such as the relationship between event update, sampling and reset (or the hold time of a trigger event in the ESV)

If the mask bit indicates that an event is unmasked, then the control flow logic 435 calls an event handler for that particular event in this embodiment. The control flow logic 435 may vector into the event descriptor table 430 based on the bit position in the event schema vector, and accordingly, the event descriptor table may have N entries corresponding to the N bits in the event schema vector. The event descriptor table may contain a handler address indicating an address to which the control flow logic 435 should re-direct execution, and may also include other information as may be useful in a particular embodiment. For example, privilege level, thread, process, and/or other information may be maintained or updated in the event descriptor table.

In another embodiment, the event descriptor table 430 may not be necessary or may be a single entry that indicates an address for a single event handler to handle all events. In this case, the entry may be stored in a register or other processor storage location. In one embodiment, a single handler may be used, and that handler may access the event schema vector to determine which event occurred and therefore how to respond. In another embodiment, the event schema vector may collectively define an event that causes the control flow logic 435 to call a handler. In other words, the event schema vector may represent a variety of conditions that together signal one event. For example, the event schema mask vector may be used to designate which of the events indicated by the event schema vector must occur to trigger execution of the handler. Each bit may represent a monitor reaching a programmable condition. When all the non-masked monitors reach their respective designated conditions, then the handler is called. Thus, the entire event schema vector may be used to designate some complex composite condition that should trigger the execution of the handler.

In another embodiment, multiple event schema vectors and masks may be used to designate different conditions. The different vectors may vector to different handlers via the event descriptor table or some other mechanism. In another embodiment, some bits of one or more event schema vectors may be grouped to form events that trigger the calling of handlers. A variety of other different permutations will be apparent to those of skill in the art.

Figures 5A, 5B, 5C:
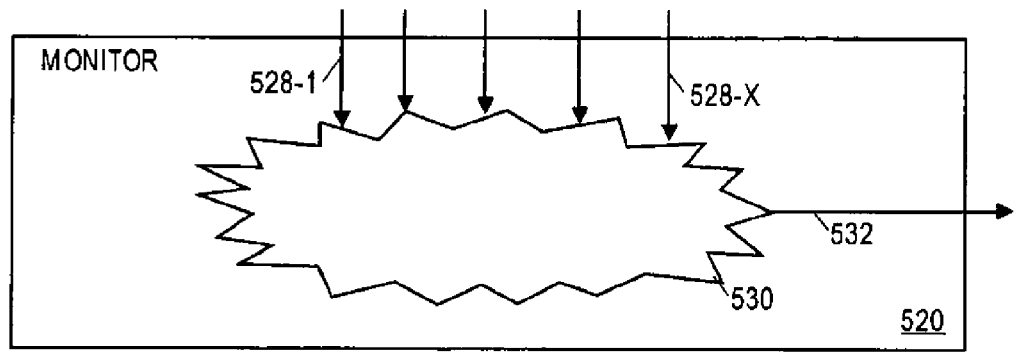
FIG. 5a illustrates one embodiment of a monitor that may recognize composite events.
FIG. 5b illustrates another embodiment of a monitor.
FIG. 5c illustrates another embodiment of a monitor.

FIG. 5a illustrates one embodiment of a monitor 500 that is programmable and capable of interfacing with a variety of performance monitors to signal a composite event. For example, in some embodiments, performance monitors may record occurrences of various microarchitectural events or conditions such as: cache misses incurred at a given level of cache hierarchy, branch retirement; branch misprediction (or retirement of mispredicted branches); trace cache delivery mode changes or events; branch prediction unit fetch requests; cancellations of memory request; cache line splits (count of completion of a split load, store, etc.); replay events; various types of bus transactions (e.g., locks, burst reads, writebacks, invalidates); allocations in a bus sequencer (or only certain types); numerical assist (an underflow, denormal, etc.); execution/retirement of a particular type of instruction or micro-operation (uOP); machine clear (or count of pipeline flushes); resource stalls (register renaming resources, pipeline, etc.); processing of tagged uOPs; instructions or uOPs retired; lines allocated (and/or of a particular state (e.g., M)) in cache; a number of cycles instruction fetch is stalled; a number of cycles instruction length decoder is stalled; a number of cache fetches; a number of lines allocated (or evicted) in cache or the like. In other embodiments, other events or combinations of events may be monitored.

In order to detect events and scenarios, such as those listed above, various boolean combinations of architectural state ("triggering conditions") may be defined within a processor's channels, in one embodiment. For example, in one embodiment, a triggering condition may be the execution of an instruction or particular class of instructions (e.g., multimedia or branch instructions). Furthermore, a triggering condition may be defined as a function of the occurrence of an instruction translation look-ahead buffer (ITLB) miss, or as a result of an instruction executed during a pending interrupt, or being executed from a particular address range. These are only a few examples of instruction-based triggering conditions. Others may be used in other embodiments.

Similarly, triggering conditions may be defined as a function of a clock signal within a processing resource in which events are monitored. For example, a triggering condition may be defined to detect the occurrence of a non-halted core or reference clock. Power events may also be used as a basis for defining a triggering condition, in some embodiments, including clock frequency and/or voltage changes, or microarchitectural throttling events.

Numerous other triggering conditions may be defined for any number of other processing resource events or conditions, including instruction branches, cache accesses and transactions (e.g., snoops), fetch/pre-fetch conditions, numerical assist conditions (e.g., overflow, underflow, denormal, etc.), and conditions causing pipeline stalls (e.g., machine clear operations).

In addition to triggering conditions, scenarios can be defined by the input information they receive to cause the triggering condition. In one embodiment, scenarios may use scenario-specific input data to tailor the triggering conditions, they may maintain state history that is used to trigger a yield, and they may maintain state information that can be reported to a service routine after a yield. Examples of input information that may be defined within a given scenario, in at least one embodiment, include a sample after value (SAV) to specify an initial value of a counter to specify a given time interval upon which to trigger, an underflow indicator (e.g., underflow bit) to indicate the point at which a counter, such as a downward counter, underflows, latency threshold(s) to indicate the maximum latency of an operation whose performance is to be monitored, and software instruction and/or data address ranges specifying a range of instructions or data used by instructions to cause a triggering condition. Other input data may be used in other embodiments.

In addition to input information, processing state history information may be used to trigger a yield in some embodiments. Examples of state history information that may be used to trigger a yield, in at least one embodiment, include a current counter value (e.g., downward counter value), branch trace history (e.g., calls, returns, conditional branches, unconditional branches, indirect branches, forward/backward branches, taken/not taken branch, mispredictions, etc.), call stack state information (e.g., return pointer value, etc.), addresses or source of event-causing instructions or data, cache coherency state, and microarchitectural state, such as latency information and TLB state. Other processing resource state history information may also be used as a trigger condition in other embodiments.

Triggering events may cause a yield to occur, as previously discussed. In one embodiment, the triggering events may cause a yield that behaves like a fault condition ("fault-like" yield), whereas in other embodiments, triggering events may cause a yield that behaves like a trap condition ("trap-like" yield). Furthermore, some scenarios fault as soon as the uOP for which the triggering condition is recognized is eligible for execution. Other scenarios may generate a fault upon detection of a write-back or instruction retirement, or upon some time measurement related to these events, such as faulting on a load instruction having a longest-latency cache miss.

Faulting may be useful in response to conditions where some action is to be taken prior to the result of the fault-causing event changing architectural state in processing resources. For example, faulting enables other functions to be performed during the detection of a longest latency cache (LLC) miss. In this and other situations, faults can be used to check actions to be taken by software before they are actually performed and to obtain the exact conditions in which an instruction is executed. Trap-like scenarios, on the other hand, are able to record and report the results of executing an instruction or group of instructions.

As previously mentioned, scenarios may defined by programming a combination of event conditions on which to trigger. Specifically, embodiments of the invention may combine any number of events discussed above or otherwise into one or more scenarios that can be monitored in order to collect performance data of user-level program running on some processing resource. A scenario may cause a yield on the first and every subsequence instance of a triggering condition or after some number of instances ("sampling").

Scenarios may be viewed as precise or imprecise in one embodiment. A precise scenario may be one that is guaranteed to cause a trigger, and subsequently a yield event, for only an instruction that experienced the triggering condition. For example, a precise LLC miss scenario may only cause a yield event after some predefined number of LLC misses, in which case only the instruction that resulted after at least the specified number of predefined LLC misses would cause a yield event, and all other instructions would not.

In contrast, an imprecise scenario may not be associated with any particular instruction. Instead, in an imprecise scenario, only the event that caused the yield condition is recorded or used. For example, an imprecise scenario may be one in which a change to a cache line state is recorded due to the occurrence of a snoop operation to that cache line. In this case, the instruction causing the snoop operation would not be recorded and any event counting may continue. Only the occurrence of the changed cache line state, and perhaps some information about the context of that snoop, such as what instruction was executing when the snoop occurred, or what the value of the time stamp counter was, is recorded.

In one embodiment, an imprecise event may be more precisely monitored by counting the number of events that occur following the imprecise event ("skid"). For example, counting the skid in one embodiment allows a user to correlate an event with a particular instruction by ruling out instructions associated with events subsequent to the event of interest.

Scenarios may also be characterized, in one embodiment, according to whether they result in a hint to some monitoring program or logic, or whether the scenario results in an architectural state change within a processing resource. For example, a hint scenario may not be required to count or to cause a yield event on every instance of the triggering condition. On the other hand, an architectural scenario may not be able to cause a yield on every instance of the triggering condition, but yet it may not ignore any instance of a triggering event. For instance, because in some embodiments counting and faults after executing a particular instruction or instructions may be suppressed, fault-like scenarios may be characterized as hints rather than of architectural scenarios.

In addition to resulting in a hint or an architectural state change, scenarios may have certain other effects ("side effects") within processing resources. For example, a scenario may have side effects on non-channel state, such as writing a buffer upon an EREAD invocation.

Performance monitors are often included in processors to count certain events. The programmer may read such performance monitors' counts by manufacturer-defined interfaces such as specific processor macro-instructions like the RDPMC instruction supported by known Intel Processors. See, e.g., Appendix A of Volume III of the Intel Software Developers Guide for the Pentium® 4 Processor. Other internal or micro-instructions or micro-operations may be used to read performance counters in some embodiments. Thus, for example, performance monitors may be adapted for use with disclosed techniques. In some cases, a programmable performance monitor may be modified to provide event signaling capabilities. In other embodiments, performance monitors may be readable by other monitors to establish events.

In the embodiment of FIG. 5a, the monitor 500 may include a set of programmable entries. Each entry may include an entry number 510, an enable field 511, a performance monitor number (EMON #) 512 to specify one of a set of performance monitors and a triggering condition 514. The triggering condition may be, for example, a certain count that is reached, a count that is reached within a certain period, a difference in count, etc. The monitor 500 may include logic to read or otherwise be coupled to receive counts from the designated performance monitors. The monitor 500 signals the control flow logic when the various M conditions occur. A subset of the M entries may be used by selectively programming the enable fields for each entry.

FIG. 5b illustrates another embodiment of a monitor 520. The monitor 520 represents a custom composite event monitor. The monitor 520 receives a set of signals via signal lines 528-1 through 528-X from various execution resources or resource portions and combines them via combinational logic 530. If the proper combination of signals is received, the monitor 520 signals the control flow logic via an output signal line 532.

FIG. 5c illustrates another embodiment of a monitor 540. The monitor 540 includes a table having M entries. Each entry includes an enable field 552, a condition field 554, and a trigger field 556. The condition field may be programmed to specify what combination of input signals (scenario) is to be monitored. The scenarios may or may not be tied to other event detecting structures such as performance monitors, and therefore may be more general than those discussed with respect to FIG. 5a. The trigger field 556 may specify the state of those input signals needed to signal the control flow logic. Again, each entry may be enabled/disabled via the enable field 552. In some embodiments, the condition and trigger fields may be combined. Various combinations of these and other types of known or otherwise available like, simpler, or more complex monitors will be apparent to one of skill in the art.

For the purpose illustration of one embodiment, several scenarios will be discussed that may be used in conjunction with at least one embodiment of the invention. In particular, several scenarios are presented along with a summary of parameters that may be programmed into channel states to monitor the scenarios. Scenarios that may be monitored in one embodiment include those that monitor when a particular instruction or instructions is/are retired ("IR-LBR" scenario), scenarios that generate a yield after a load instruction fault resulting from a longest latency cache miss ("LF-LLC Miss-LBR" scenario), scenarios that generate a yield after a load instruction is retired following a longest latency cache miss ("LR-LLC Miss-LBR"), scenarios that generate a yield after a branch is retired ("BR-LBR" scenario), scenarios that generate a yield after a certain number of un-halted core clock cycles ("UCC-LBR"), scenarios to record data addresses, access latencies, and source information after sampled loads ("LR-LLS-LBR"), and scenarios that generate a yield after a snoop operation ("snoop" scenario).

Below is a table summarizing the above-mentioned scenarios and their corresponding inputs, triggering conditions, sampling type, state history information, yield type, precision characteristic, whether the scenario results in a hint condition versus an architectural state transition, and any side effects of the scenario:

|  | IR-LBR | LF-LLC Miss LBR | LR-LLC Miss-LBR | LFP-LLC Miss | BR-LBR | UCC-LBR | LR-LLS-LBR | Snoop |
|---|---|---|---|---|---|---|---|---|
| Scenario | Instructions | Loads with an LLC miss | Loads with an LLC miss | Loads with an LLC miss that are pre-data ready | Branches | Unhalted core clocks | Sampled loads | Snoops |
| Sampling Inputs | Yes Sample-after value (SAV) | Yes SAV | Yes SAV | Yes SAV | Yes SAV | Yes SAV | Yes SAV | No Data Address |
| State history | Branch trace (LBRs), Sample_EIP, BrInfo | LBRs, Sample_EIP, BrInfo | LBRs, Sample_EIP, BrInfo | None | LBRs, Sample_EIP, BrInfo | LBRs, Sample_EIP, BrInfo | LBRs, data source, coherence state, *TLB misses, latency, Sample_EIP, BrInfo | None |
| Fault vs. Trap | Trap | Fault | Trap | Fault | Trap | Trap | Trap | Trap |
| Precise vs. Imprecise | Precise | Precise | Precise | Precise | Precise | Precise | Precise | Imprecise |
| Hint vs. arch. | Arch | Hint | Arch | Hint | Arch | Arch | Arch | Arch |
| Side effects | EREAD buffer | EREAD buffer | EREAD buffer | EREAD buffer | EREAD buffer | EREAD buffer | EREAD buffer | None |

In some embodiments, other scenarios may be programmed and other parameters may be used to characterize a scenario. However, the table above illustrates the characteristics of at least some of the scenarios that may be used to monitor performance within a processing resource according to one embodiment.

Figure 6:
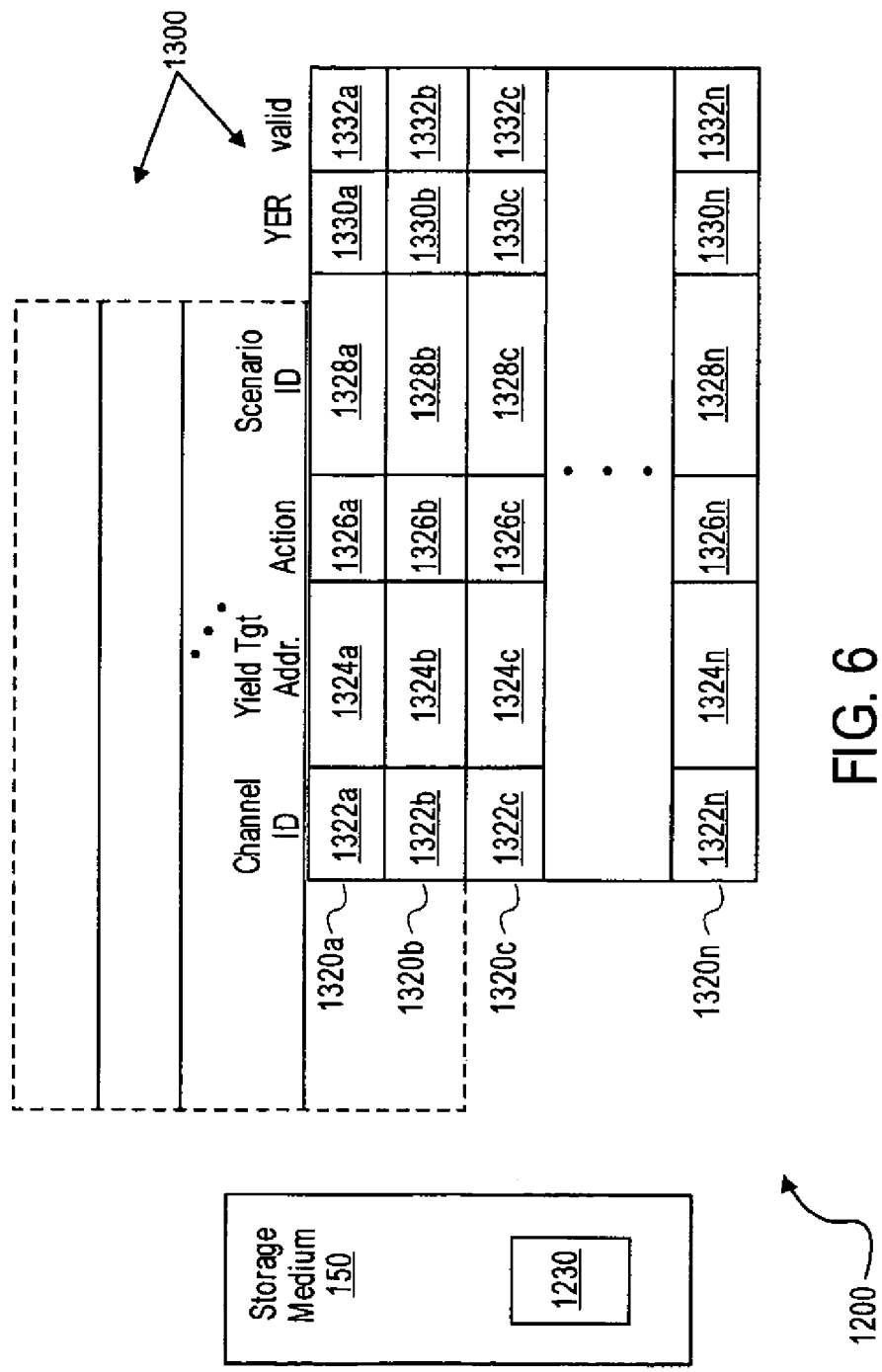
FIG. 6 is a block diagram illustrating certain details for at least one embodiment of a system that can detect and respond to architecturally-defined processing conditions of execution resources.

FIG. 6 illustrates further detail for the channels 1300, as illustrated in FIG. 1, for at least one embodiment of a system that can detect and respond to architecturally-defined processing conditions of execution resources. The channels are a set of architectural states. For at least one embodiment, each channel includes a scenario identifier and occurrence-response information.

For at least one embodiment, the state information for a channel may be maintained in programmable channel register 1320. The channel register 1320 may be part of an architecturally-visible mechanism to map an architectural trigger condition to a handler address. Another part of the architecturally-visible mechanism may be an instruction. That is, at least one embodiment of a system 1200 that includes the channel registers 1320 may support an architectural instruction that provides for programming (by, for example, an instruction in a user-level program) the contents of the channel registers 1320. Such an instruction may be referred to herein as an EMONITOR instruction.

FIG. 6 illustrates that the state information for the channels 1300 may be maintained in one or more channel registers 1320. For at least one embodiment, only one set of channel registers 1320 is utilized. For other embodiments, additional channel registers may be utilized. The optional nature of additional channels 1300 is denoted in FIG. 6 with broken lines.

For example, a first set of channel registers 1320 may be utilized to map yield events for one level of privilege (such as ring 0 operations) and a second set of channel registers 1320 may be utilized to map yield events for another level of privilege (such as ring 3 operations). In this manner, transition to particular service threads may be identified for particular service levels.

For at least one embodiment, each channel register 1320 may be utilized to specify an architecturally-defined event or set of conditions. The event or set of conditions may be referred to as a scenario. The event or set of conditions may be architectural, microarchitectural, or a combination of both.

The channel registers 1320 may be further utilized to map a target yield address to the specified scenario.

The scenario may be identified by placing a value in the "scenario ID" field 1328 of the register 1320. For at least one embodiment, each register 1320 includes a scenario ID field 1328. The scenario id field 1328 may be modified (via execution of an EMONITOR instruction, for instance) to hold a value that represents an architecturally defined scenario.

A scenario may be used on all channels simultaneously. In other words, the same scenario can be programmed on more than one channel at a time. Each time a scenario is configured to a channel, it is instantiated once. All instances of the scenario execute independent of each other. For example, the "instruction retired counter underflow" (IR-LBR) (see scenario 3 in table below) scenario can be configured on both channel 0 and channel 1 at the same time. The counter of the IR-LBR instance configured on channel 0 may be set, for instance, to 500 k by the main thread program. Similarly, the counter of the IR-LBR instance configured on channel 1 may be set by the main program to a different number, such as 100 k. For such example, channel 1 may generate a yield event request after 100 k instruction are retired while Channel 0 may generate a yield event request after 500 k instructions are retired.

A scenario is a Boolean expression of selected architectural and/or microarchitectural conditions that can occur during execution. Examples include the retirement of an instruction, or a longest-latency cache miss. Satisfaction of the scenario conditions may cause a counter to increment or decrement and/or may lead to setting of a value in the YER field 1330 (discussed below). A scenario may include a single processor event (see, e.g., Scenario Identifiers 1 and 3 in the table below). Alternatively, a scenario may be a composite of two or more raw events (see, e.g., sample Scenario Identifiers 0 and 2 in the table, below). For at least one embodiment, the scenario may be a Boolean expression of two or more raw events. An example of some example scenarios that may be architecturally defined for a system, such as, e.g., the sample system illustrated in FIG. 1, are set forth in the table below. Such examples should in no way be taken to be limiting and are provided by way of example only. Alternative embodiment could, of course, implement in the channel register a bit mask that allows the user to define a user-defined set of raw events as a triggering scenario for a channel.

| Scenario Identifier | Boolean Definition |
|---|---|
| 0 | Last level cache miss AND pipeline stall |
| 1 | Address match for interconnect (bus or point-to-point) |
| 2 | Last level cache miss AND cache miss counter overflow |
| 3 | Instruction retired counter overflow |
| 4 | Retired branch counter overflow |
| 5 | Fault-type load miss in last level cache AND early data ready |
| 6 | Unhalted core clocks |
| 7 | LD instruction retired with linear address, latency, data source |

The above table illustrates that certain of the scenarios may be defined as composite Boolean expressions, such as scenarios 0, 2, 6 and 7. For scenario 0 illustrated in the above table, the scenario includes a last level cache miss and a pipeline stall. For such scenario, it is desired that disruption of a main thread be triggered when a pipeline stall is experienced as a result of a cache miss. Similarly, scenario 2 illustrated in the above table may be defined as a last level cache miss and overflow of a cache miss counter. For such scenario, disruption of processing is triggered only after a predetermined number of cache misses has been experienced. Scenario 6 illustrated in the above table may be satisfied when a clock tick has occurred at core frequency and the processor was not halted when the clock tick occurred. Scenario 7 illustrated in the above table may be satisfied when an architectural load instruction retires and the latency of the load instruction met or exceeded a specified threshold.

The above table also illustrates scenarios that are architecturally defined as a single raw event. For example, scenario 1 illustrated in the above table is defined as a single raw event. That is, scenario 1 is defined as a match for interconnect address. For such scenario, disruption of processing may be triggered when the address of the processor (see, e.g., 100 of FIG. 1) matches the address for a communication packet this is received from another processing element of the system. The address may be received over, for example, a multi-drop bus or a point-to-point interconnect (not shown).

The above table illustrates that scenario 4 may also be defined as a single raw event. Specifically, scenario 4 may be defined as overflow of a counter that tracks the number of retired instructions. For such scenario, disruption of processing is triggered when the retirement counter indicates that the desired number of instructions has been retired. Such scenario may be useful for performance monitoring processing. For scenario 4, the number of instructions whose retirement satisfies the scenario condition may be programmable.

Scenario 5 illustrated in the above table may be defined as a single raw event—a last level cache miss for an architectural load instruction. For such scenario, the machine doesn't wait for the data to return before the yield event is taken. This creates an opportunity to get other useful work accomplished in the shadow of the last-level-cache ("LLC") miss. The purpose of Scenario 5 is thus to create an opportunity to do useful work in the shadow of an LLC miss.

Accordingly, the channel register 1320 may include an additional optional field (not shown) whose value identifies scenario-specific information. Such scenario-specific information may include, for example, a count value after which to trigger (also called sample after value). Regarding a sample after value, the conditions for taking a yield event may include counting and the consequent setting of a counter, such as an underflow or overflow counter, which can be set either by the down-counting from a user-specified sample-after value, or by pre-setting the Underflow bit by the user.

For instance, some scenarios, such as profile-guided optimization (PGO) scenarios, may use a counter to determine when to set the yield event request bit.

Other examples of scenario-specific information that may be included in an optional field of the channel register 1320 include a threshold value, and/or a linear address. For example, snoop-related scenarios may hold a linear address as part of their scenario-specific state. Of course, other additional state information not specifically enumerated herein may also be specified by a EMONITOR instruction for the optional scenario-specific information field for a particular channel register 1320.

The scenarios architecturally defined for any particular embodiment may be prioritized. Accordingly, if more than one scenario occurs at relatively the same time, only one is picked for immediate servicing. The other(s) scenarios occurring at the same time may be logged for later servicing.

FIG. 6 illustrates that each register 1320 also includes a "yield target address" field 1324. Again, a value for the yield target address field 1324 may be programmed into the channel register 1320 via execution of the EMONITOR instruction. For at least one embodiment, the value placed into the yield target address field by the EMONITOR instruction is referred to herein as a "thread yield EIP." For at least one embodiment, the thread yield EIP represents an offset into the current code segment.

The current code segment, for purposes of this discussion, may be the code segment indicated by a register such as a code segment ("CS") register. The offset represented by the yield EIP may represent an offset from the beginning of the code segment to the first instruction of the selected service thread or event handler that is to be executed when the conditions of the indicated scenario are met. Of course, one of skill in the art will recognize that the thread yield EIP value placed into the yield target address field 1324 of a channel register 1320 may, instead, be any other value that indicates a starting address, including an address value or a pointer.

The yield target address field 1324 is optional for at least one embodiment of the system 1200 illustrated in FIG. 6. For one embodiment, for example, the thread yield EIP is maintained in a memory structure, such as a user stack.

FIG. 6 illustrates that each channel register 1320 may also include other, optional, fields. These optional fields may include a channel identifier field 1322, a action field 1326, a yield event request ("YER") field 1330, and a valid field 1332. One of skill in the art will recognize that these optional fields 1322, 1326, 1330 and 1332 are provided for illustrative purposes only and should not be taken to be limiting. For other embodiments, fewer fields, or different fields, may be defined in the channel registers 1320.

For the embodiment illustrated in FIG. 6, the optional channel identifier field 1322 may be utilized to identify the channel register 1320. For at least one embodiment, the values for the channel identifier field 1322 numbers may not be unique among all channel registers. For example, for an embodiment that maintains one set of channel registers for one privilege level, and another set of channel registers for another privilege level, the channel identifiers may be repeated among the sets. For example, one set of channel registers 0-3 may be allocated for ring 3 operations while another set of channel registers 0-3 may be allocated for ring 0 operations.

The channels may thus be associated with ring levels. Each channel is assigned to a ring level and can only be used in this ring level. Although only four channels are illustrated in FIG. 6 for each ring level, such illustration should not be taken to be limiting. Any number of channels may be supported for each ring level, and each ring level need not necessarily be allocated the same number of channels as other ring levels. For at least one embodiment, each ring level can have up to 256 channels which are indexed from 0 to 255. The channel identifier, also called a channel index, for such embodiment may be encoded in an 8-bit space; the channel identifier field 1322 may thus be an 8-bit field.

The optional action field 1326 may be utilized as follows. The value of the action field 1326 indicates the type of action that should be taken when the scenario identified in the channel register's scenario identifier field 1328 occurs. For at least one embodiment, the action field 1326 is a four-bit field that can therefore encode up to 16 action types. For at least one embodiment, the valid action type values for the action field 1326 may include a yield action value and a status bit update value. If the action field 1326 includes the yield action value, then the following action will be taken: when the YER field for the channel is set (see discussion of YER field 1330, below), a yield event will occur such that control flow will be transferred at the instruction indicated in the yield target address field 1324.

If the action field 1326 includes the status bit update value, then the channel is in "silent" mode, and no yields will be taken by the channel. That is, when the specified scenario for the channel occurs, a yield event will not occur. Instead, certain specified status bits are updated. For example, the value of the YER field 1330 may be updated.

The value in the optional YER field 1330 may be utilized to indicate whether the triggering condition defined by the scenario has occurred, along with any other conditions required by the scenario, such as a counter underflow and precision constraints. For at least one embodiment, the YER field 1330 may be a one-bit field.

The value of the YER field 1330 may be set by the processor when a triggering condition, and any other required conditions, for a scenario have been met. However, the yield event request bit can be defined to be set only if the privilege level at which the triggering condition is detected matches the channel's privilege level, or if the privilege level at which the triggering condition is detected is greater than or equal to the channel's privilege level.

For at least one embodiment, the YER value may be cleared by the processor when that channel's yield event successfully transfers control to the designated yield target address. If the YER bit is set but the yield event cannot be serviced, and an additional triggering condition occurs, a counter may record the additional triggering condition while the YER bit remains set. For at least one embodiment, the clearing of the YER value and/or the recordation of additional triggering conditions may be performed by an event handler mechanism.

The YER value 1330 may useful for an embodiment that allows triggering scenarios to be serviced as either a fault-like yield event or as a trap-like yield event. That is, some scenarios may fault as soon as the instruction or micro-operation for which the triggering condition is recognized is eligible for retirement, such as faulting on a load that has a longest-latency cache miss. Faulting may enable work to be accomplished in the shadow of an LLC miss. The value in the YER field 1330 thus may be set to indicate a fault-like yield. (For at least one embodiment, the value of the YER field 1330 is set by hardware.) This type of value in the YER field 1330 may be set, for example, when the yield event is intended to trigger a service thread whose concurrent execution with a main thread is intended to clear up a condition that would otherwise cause the main thread to stall or perform poorly. The service thread may thus perform processing in the "shadow" of the event defined by the scenario that triggered the yield event. This allows the service thread to perform its processing as if the faulting instruction has not occurred at all, in parallel with the main thread processing.

A fault-like yield event thus appears to software that the faulting instruction has not been executed. When the yield event is delivered, the processor states look to the software like the faulting instruction has not yet been executed. For example, consider a load instruction (LD) that is to update the value of a register, R1. Consider, for purposes of example, that a channel has been programmed to perform a fault-like yield event (based on value of the scenario id) when the load instruction yield event occurs and that an architectural scenario has been identified for a faulting load instruction, and that the scenario identifier field 1328 value specifies this scenario. At the time that software is handling the yield event, the event handler does not see any update to R1 based on operation of the LD instruction.

In contrast, trap-like scenarios are able to record and report the results of executing the instruction. Such scenarios are useful when it is desired that the trapping instruction complete execution before the yield event processing is performed. By setting the value of the YER field 1330 to an appropriate value, a trap-like yield event may be indicated. Such type of event may be useful, for example, when the event handler is to perform performance monitoring. In such case, it may be desirable for the trapping instruction to complete execution before processing performance monitoring information based on execution of the instruction. A trap-like yield event thus appears to a programmer as if the trapping instruction has already been retired.

Accordingly, a yield event may be programmed in a channel register 1320 as either a fault-like event or trap-like event, depending on which scenario id has been selected. For at least one embodiment, trap-like yield events are only signaled on an interrupt boundary. In contrast, fault-like yield events may be signaled in the middle of an instruction, for at least one embodiment.

As is explained above, even if the values of a channel register 1320 have been programmed to indicate that a yield event should be processed upon occurrence of a scenario, such yield event will not be taken if the blocking indicator 1380 for the ring level associated with the channel register 1320 indicates that yield events should be blocked.

For at least one embodiment, multiple channels can be used simultaneously, but only one channel's yield event can be serviced at a time. That is, if multiple yield events occur simultaneously, the processor selections the highest priority event for servicing. Such selection may be performed, by at least one embodiment, by an event handler mechanism.

The process of invoking the service routine when servicing a yield event may include setting the yield blocking indicator 1380 and clearing the value of the yield event request field 1330 for the highest-priority channel, whose service routine is invoked by a yield event. Again, the clearing of the YER field 1330 may be performed by an event handler mechanism. The clearing of the blocking indicator 1380 may be performed by execution of an ERET instruction at the end of the service routine.

Regarding priority, a priority may be established among channels, since the YER bit may be set for the same uop or instruction for multiple fault-like scenarios or trap-like scenarios, respectively, at the same privilege level. (Yield events are only taken for channels associated with the current privilege level). For at least one embodiment, a different priority scheme may be used for fault-like than for trap-like scenarios.

For trap-like scenarios, whenever there is an opportunity to take a trap-like yield, the highest-priority channel for which the YER bit is set and for which the channel action field is set is serviced first. For at least one embodiment, the highest-priority channel is the lowest-indexed channel with a pending trap-like yield request. As that yield is taken, the YER bit is cleared for that channel. Other channels' YER bits remain set, and they are serviced at the next window for taking traps, if their conditions for taking a yield event still hold (i.e., when the yield block bit is clear, the YER bit is still set, etc.). In this manner, each channel's pending trap-like yield is serviced in turn, with a fixed, predictable ordering.

For fault-like scenarios, prioritization may be handled as follows. When there is an opportunity to take a fault-like yield, exactly one fault-like yield among all programmed fault-like scenarios is selected, and all other fault-like yield requests generated by other fault-like scenarios are dropped, i.e., their channel YER bits are cleared. Fault-like scenarios that can be triggered by the same dynamic instance of an instruction are prioritized at the time they are defined. For scenarios so defined, the highest priority scenario is selected to be serviced and all other lower-priority scenarios will have their channel YER bit cleared and thus they are not serviced for this event occurrence. They will be serviced the next time the event occurs if the higher-priority scenarios are not ready to fire. For scenarios that do not have pre-defined priority, they are serviced in the order which they are encountered during execution. The fault-like scenarios does not have YER bit semantics.

On the topic of prioritization, it should be noted that yield events may be prioritized among other processor events (such as traps and exceptions). For at least one embodiment, this may be accomplished via a priority table. An example of a priority table is set forth below in the table below. One of skill in the art will understand that other embodiments may include different processor events. The table below is set forth below merely for purposes of example.

FIG. 6 illustrates that a channel register 1320 may also include a valid field 1322. The value of the valid field 1322 indicates whether the register 1320 contains valid data. For at least one embodiment, the valid field 1322 is a one-bit field. For such embodiment, the channel is valid when the value in this field is set. The channel is invalid when the value of the one-bit field 1322 is cleared. When the channel valid bit is clear, all of the other channel state is invalid, and will be read as 0. (See discussion, below, of EREAD instruction for reading the contents of a channel register).

Similarly, at least one embodiment of the system 1200 may also support an architectural instruction that provides for reading the contents of a channel register 1320. Such an instruction may be referred to herein as an EREAD instruction.

FIG. 6 illustrates that a storage medium 150 may include an operating system 1230. For at least one embodiment, the operating system 1230 may provide context management functionality, such as context save and restore services, for channel state when a context switch occurs in response to the monitor events programmed into the channel register(s) 1320.

In addition to an EMONITOR instruction that may program the various fields (except the YER BIT) of the channel register 1220 as discussed above, the system illustrated in FIG. 6 may also provide an architectural instruction that provides for an instruction in a user program to query the contents of a channel register 1202. At least one embodiment of such an instruction is referred to herein as an EREAD instruction. In addition, the system illustrated in FIG. 6 may also provide an architectural instruction that returns control to a main thread after a yield event has been delivered. Such instruction is referred to herein as an ERET instruction.

Certain details for the EMONITOR, EREAD, and ERET instructions are set forth generally in the table below. In addition, further detail for each of the instruction is set forth in the discussion following the table below. One of skill in the art will recognize the specific opcodes, register names and field bit lengths and values are provided for illustrative purposes only and should not be taken to be limiting. Other opcodes, field lengths, field values, and register names may be utilized without departing from the scope of the appended claims.

| Instruction | Description |
| --- | --- |
| EMONITOR | Programs a channel with data in ECX, EBX, EAX, EDX |
| EREAD | Reads a specified channel and returns the data in ECX, EBX, EAX, EDX |
| ERET | Yield interrupt return. |

EMONITOR—Set up channels. EMONITOR takes input from registers (referred to as ECX, EBX, EAX, and EDX below) to program a channel.

ECX
  ECX[7:0] contains scenario ID, 0 to 255;
  ECX[12:9] contains channel action encoding
    0 means no action;
    1 means call yield event;
    2 to 15 are reserved.
  ECX[13] contains yield event request.
  ECX[15:14] contains ring level.
  ECX[23:16] contains channel ID, 0 to 255.
  ECX[24] contains channel valid bit
  Other bits are reserved to zero. Non-zero values in any reserved bit may cause the instruction to fault.

The value in ECX[23:14] specifies the channel to be programmed by the EMONITOR instruction. It should be noted that the EMONITOR instruction may be implemented to allow higher priority code to access channels that have been allocated for lower priority code. Accordingly, ring 0 code may be permitted to access ring 3 channels. Therefore the channel selection needs to take ring level into account (e.g., ECX[15:14]). However, ring 3 code cannot access the channels that belong to ring 0. If ring 3 code executes this instruction with ring level specification in ECX[15:14]=0, the instruction may cause a general purpose fault.

If ECX[13], the yield event request bit, is set to 1 for a precise scenario, a general purpose fault will result, since it doesn't make sense for an instruction, EMONITOR, to set the YER for an instruction which otherwise did not meet the triggering conditions.

EBX contains the YIELD_TARGET_EIP. The EMONITOR instruction thus sets the value in the yield target address field 1324 of the specified channel with the address specified in EBX.

EAX communicates additional scenario-specific information to the instruction. The scenario definition specifies what additional information is required to be provided to set up a channel properly to monitor the scenario. EAX can contain the additional data to be loaded or can be a pointer to a memory buffer from which additional data is loaded. The use of EAX is scenario specific. EAX is ignored if the specified scenario does not have any additional states defined.

EDX communicates additional hints to the instruction and will not change the architectural behavior of the instruction. EDX is reserved as 0 if the specified scenario does not have any hints defined.

EREAD—Read channel. The EREAD instruction does the reverse operation of the EMONITOR instruction. It reads the channel specified in ECX [23:14] and returns the data into ECX, EBX, EAX, and EDX. As with the EMONITOR instruction, EAX can contain a pointer to a memory region into which EREAD stores the additional channel scenario specific data. Some scenarios do not have any additional data. Therefore, EAX is not used for those scenarios.

EREAD may utilize the following fields of ECX as input parameters:
 ECX[7:0] contains the scenario ID, 0 to 255.
  ignored if ECX[8]=0
 ECX[8] contains the Match scenario ID bit.
  1 requires that the scenario-specific side effects for non-channel state to occur if the value in the channel scenario ID field matches ECX[7:0].
  0 requires that such scenario-specific side effects do not occur, regardless of the channel's scenario ID field, i.e. ECX[7:0] is ignored
 ECX[15:14] contains the ring level.
 ECX[23:16] contains the channel ID, 0 to 255.
 Other bits are reserved to zero. Non-zero values in these bits causes the instruction to GP fault.

For EREAD, the use of EAX to hold a parameter for the instruction is scenario specific. EAX may be used to specify a valid memory pointer to a memory region into which the scenario specific data can be stored upon EREAD. For scenarios dumping out no additional data, EAX may be ignored by the EREAD instruction. For at least one embodiment of the EREAD instruction, EBX and EDX are not utilized.

The layout of states returned by EREAD is as follows (which corresponds to the input format defined for EMONITOR, discussed above):
 ECX
  ECX[7:0]←scenario ID in channel, 0 to 255.
  ECX[8]←0.
  ECX[12:9]←channel action.
  ECX[13]←yield event request.
  ECX[15:14]←ring level (unchanged from input)
  ECX[23:16]←channel ID, 0 to 255, (unchanged from input)
  ECX[24]←channel valid bit.
  Other bits of ECX contain 0 for at least one embodiment.
 EBX may contain the yield target address. EDX may contain additional hints associated with the channel. EDX is read as 0 if the specified scenario does not have any hints defined.
 [EAX] contains additional scenario-specific data, if there is any. For example, the current EIP value and LBR are dumped into the memory buffer pointed to by [EAX] for the "retired instruction counter underflow" scenario.

EAX contains the additional scenario-specific data that EMONITOR specifies in EAX to program the scenario logic. For example, the current counter value is returned in EAX for scenarios that support a counter. EAX is unchanged if the specified scenario does not have any additional states to be returned in EAX.

If the channel is invalid, as indicated by the value in the valid field 1332, all registers (EAX, EBX, ECX, EDX) are read as 0, except for ECX[23:14].

ERET—Yield interrupt return. For at least one embodiment, user-level event handling triggered by satisfaction of trigger conditions in a channel is performed as an atomic block with respect to receiving another yield event. When a yield event occurs, a yield event handler mechanism may set a value in a yield block indicator (see, e.g., 1380, FIG. 1) to prohibit further yield events and therefore enforce atomicity. The ERET instruction unblocks the yield event (by clearing the yield block indicator) to re-enable yield events. The ERET instruction is used by the channel's service routine to return to the continuation point. The ERET instruction thus transfers the program control back to a return address.

Accordingly, the ERET instruction obtains the return address as part of its operation. For at least one embodiment, the ERET instruction pops the top of stack into the EIP register. Such embodiment assumes that, when a yield event is delivered, a return address is pushed onto the stack. Alternatively, the ERET instruction may obtain the return address from a register. Again, for such embodiment it is assumed that the return address (e.g., the address of the next instruction following the interrupted point) was placed into the register before the yield event was delivered. In either case, for at least one embodiment the return address is saved (either in a register or on the stack) by a yield event mechanism.

Scenarios may be defined and used in some embodiments to improve or optimize user-level software for a particular processing resource. Accordingly, at least one embodiment may be used in conjunction with various techniques, or "user models", to improve user-level software. In particular, one or more scenarios may be used to identify frequently executed instructions, or "hot code", for example. Branch profiling may be performed, in one embodiment, to improve code layout and improve branch functions. In one embodiment, cache misses may be profiled to find good candidate instructions/data to be prefetched. Furthermore, cache miss profiling may be combined with coherency profiling to help avoid cache misses, in one embodiment. The following table summarizes various user models, according to one embodiment, including scenarios and corresponding user action, to improve user-level software:

| User Model | Scenario(s) | Use |
|---|---|---|
| "Hot Code" Profiling | IR-LBR, UCC-LBR | Use IR-LBR to collect instruction samples based on instruction frequency. Use UCC-LBR to collect instruction samples based on execution duration. Focus static (next compile) or dynamic (same execution) optimization on the indicated hot spots |
| Branch Profiling | BR-LBR | Use BR-LBR to collect information on branch directions and mispredictions, and on path histories. Arrange code so that fall-through targets are most likely, perform path-based optimizations on longer sequences of code, and convert branches with poor predictability to cmovs where possible. |
| Cache Miss Profiling | LF-LLC Miss-LBR | Use LF-LLC Miss-LBR to record the load instruction address, and use the architectural registers and instruction opcode to compute the data address accessed. Identify the spatial relationship between dynamic clusters of objects, and insert software prefetches to eliminate cache misses. |

| User Model | Scenario(s) | Use |
|---|---|---|
| Cache Miss and Coherency Profiling | LF-LLC Miss-LBR, LR-LLLS-LBR | Use LF-LLC Miss-LBR to record the load instruction address, and use the architectural registers and instruction opcode to compute the data address accessed. Use LR-LLLS-LBR to record the source of data and its coherence state. Perform clustering and data layout optimizations, including affinitization, to reduce memory traffic and latency, and to eliminate false sharing |
| Load Latency Profiling | LR-LLS-LBR | Use LR-LLS-LBR to record data addresses, access latencies, and source information for sampled loads. Identify those loads which may be good candidates for prefetching. |
| Helper Threads | LFP-LLC | Use LFP-LLC Miss simply to get control when a longest-latency cache miss has occurred. Make a switch to alternate work within the same application that can make forward progress in the shadow of the cache miss. |
| Single stepping | IR-LBR | Use IR-LBR in debugging and other applications to execute a single instruction at a time. |

Other user models may be realized in various embodiments of the invention. Furthermore, other implementations, including other scenarios, may be used to realize one or more of the above-illustrated user models.

Figure 7:
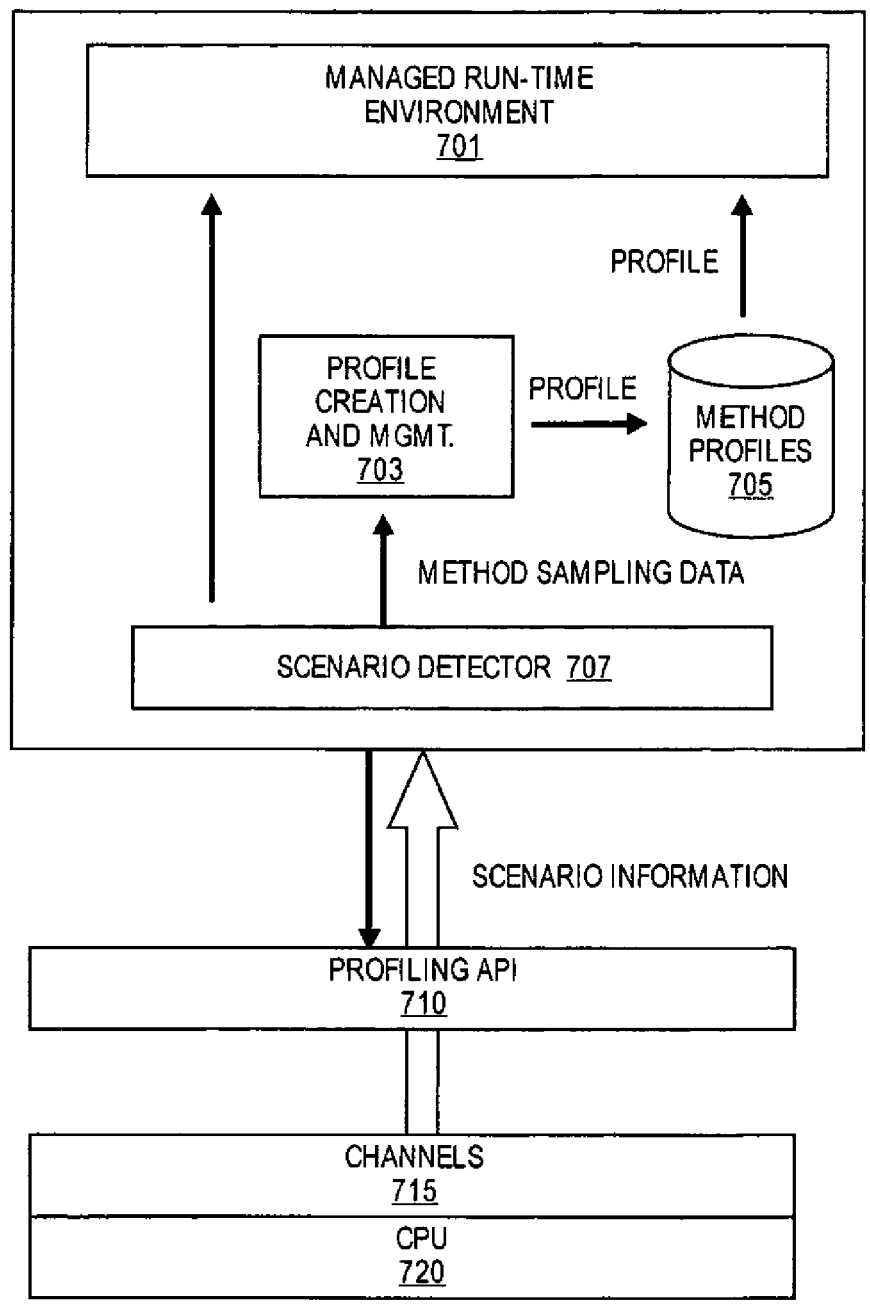
FIG. 7 is an architecture to detect performance events within a processing resource and to modify user-level software in response thereto, according to one embodiment.

FIG. 7 illustrates an architecture to monitor events occurring within processing resources and to use the monitored events to improve or optimize user-level software programs running within the architecture, according one embodiment. Particularly, FIG. 7 illustrates a managed run-time environment 701, in which user-level software programs, such as applications, may be developed. In one embodiment, a software program is performed by a CPU 720, which may include a plurality of processing resources, such as a multi-core processor and/or multiple processors. Channels 715 may be programmed via the profiling application programming interface (API) 710 to monitor events and scenarios useful in detecting certain performance characteristics of the CPU, such as code hotspots. Performance characteristics, such as code hotspots may be detected by logic or software 707 by interpreting the results of the events and scenarios programmed into the channels. Furthermore, yield actions programmed into the channels may also be interpreted and the proper handlers invoked in response thereto by the detection code/logic 707.

The performance information interpreted and detected by the detection logic/code 707 may be used to generate a profile of the monitored characteristic(s) by profile generation code or logic 703, which may then be translated into specific actions or methods by profile method generation code or logic 705 to improve or optimize a user's code, such as an application, within the managed-run time environment. Moreover, the improvements to a user's code may be done, in one embodiment, in real-time and on a per-thread basis with little or no detection overhead imposed by the performance monitoring architecture of FIG. 7. In other embodiments, other stages or functional units may be used to generate the information required to detect performance information within the CPU and to optimize a user's code in response thereto.

In order to facilitate various event monitoring operations, a processor used in conjunction with one or more embodiments may include various hardware "hooks", such as logic, storage areas, and the like. For example, in one embodiment, the processing hardware illustrated in FIG. 7 may include registers, such as user-level branch registers (ULBRs), to help store a trace of branches taken in a user-level program. A branch trace, according to one embodiment, is a sequence of recent branches that have been retired within the processor being monitored. Branch trace information may be useful for software improvements, such as path-based optimizations. Furthermore, studies suggest that microarchitectural events may correlate with call and branch history, which may be exploited through prefetching instructions corresponding to certain architectural paths. Branch traces may also be useful in obtaining multiple branch event samples at once, thereby reducing event monitoring overhead. Moreover, branch traces may provide contextual information that is helpful in software performance analysis and debugging.

In addition to ULBRs, which may be used to record branch from-to information due to user code execution, branch traces may be recorded through system-level branch registers (SL-BRs), which may be used to record branches caused by the system, including interrupts, yield events, instruction pointer returns ("ERET"). Moreover, SLBRs may record branch trace information also recorded by the ULBRs. In some embodiments, ULBRs or SLBRs may be located and maintained within a processor being monitored by one embodiment of the invention, whereas in other embodiments, they may be within and maintained by a separate processing logic. Available resources corresponding to the ULBRs and SLBRs may be indicated to a user through an identification process, in one embodiment, including a CPU identification mechanism (e.g., "CPUID").

In one embodiment, ULBRs may store 64 bits, but may store more or less in other embodiments. Furthermore, ULBRs may only be updated under circumstances, in some embodiments. For example, in one embodiment, the ULBRs are not updated if either the beginning or end of the execution of a branch is not of a certain privilege level (e.g., "ring 3" according to an x86 architecture), or if there is not a valid channel which identifies a scenario that may make use of a ULBR, or if a yield block bit is set at either the beginning or end of the execution of a branch, or if processor being monitored is in a mode for which channels are disabled at either the beginning or end of the execution of a branch. Furthermore, the ULBRs may not be updated in other situations, including if the global freeze bit is set at either the beginning or end of the execution of a branch, or if a branch is not taken, or if a control transfer is a yield event.

ULBRs may also be indicated to be valid or invalid (via a "valid" bit, for example). In particular, ULBRs may be invalidated for various reasons, including the occurrence of a context switch or virtual machine transition, or if no valid channel is programmed with a scenario that reports the ULBRs.

In some embodiments, ULBRs may not be updated for ERET instructions that are executed while the yield block bit is set. This allows ERETs to be ineligible for causing triggering when triggering is otherwise suppressed during a yield event service routine, but allowed if triggering conditions are being monitored during such service routines.

Embodiments of the invention enable precise capturing of performance event information by using coherence and source information associated with data captured in response to an event or scenario. In one embodiment, this coherence and source information may be used to indicate where in memory the data originated, in order to enable a more precise determination of the instruction or instructions that caused the event.

For example, data source and coherence information may collected both in a processor core being monitored core as well as in an associated memory controller or chipset. Particularly, interconnect messages from these sources may be interpreted to infer the source and coherency information associated with the data. In one embodiment, data source and coherence information may be stored in memory load buffers within the processor core's memory execution unit (MEU). From the MEU, the source and coherence information may be sent along with the data write-back information to the processor's retirement logic, enabling the retirement logic to precisely associate that information with a memory instruction that corresponds to the event that generated the data. Channel logic, properly programmed, may recognize and respond to these memory events, thereby allowing the collection of precise samples for memory operations.

Numerous other mechanisms may be used to generate information that may be used to monitor performance of processing hardware in various embodiments. For example, in one embodiment, execution latency of instructions may provide information as to the type of instruction being executed or the type of memory access being performed, which may assist in further improving program performance. Qualifying instructions by latency, for example, may enable one to group instructions or memory accesses according to their latency in order to create a profile, such as in a histogram, of instruction latency.

During development, a design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Thus, techniques for a system to profile and optimize user software in a managed run-time environment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
one or more execution resources;
a plurality of channels coupled to the one or more execution resources to store a plurality of state information corresponding to a plurality of instruction threads, each channel having a different priority and to be programmed to specify a trigger-action mapping for a scenario corresponding to an architecturally-defined event combination of events that occur during execution on the processor and associated with the channel, responsive to which a yield event is to occur to transfer execution to a yield event service routine associated with the channel, wherein the scenario comprises a code profiling scenario to identify one or more frequently executed instructions of at least one of the plurality of instruction threads and the architecturally-defined event combination is user-selected;
a scenario detection unit to detect performance characteristics via interpretation of the occurrence of the architecturally-defined event combination within the processor; and
a profiling unit to generate a profile of the architecturally-defined event combination, and a profile method generator to translate the profile into a method, wherein user code including the one or more frequently executed instructions of the at least one of the plurality of instruction threads is to be modified during run-time of the at least one instruction thread to optimize the user code.

2. The processor of claim 1, wherein the plurality of channels include control information to combine the events.

3. The processor of claim 2, wherein the plurality of state information comprises yield information to control the manner in which the events are to be detected by the scenario detection unit.

4. The processor of claim 3, wherein the manner in which the events are to be detected is chosen from a group consisting of: a fault-like yield and trap-like yield.

5. The processor of claim 1, further comprising a user model to use a profile chosen from a group consisting of: hot code profiling, cache miss profiling, cache miss and coherency profiling, load latency profiling, and helper threads.

6. The processor of claim 1, wherein the profiling unit is to interface with the plurality of channels via an application program interface (API).

7. The processor of claim 1, wherein the plurality of instruction threads are to be modified on a per-thread basis during run-time of the plurality of instruction threads.

8. A processor comprising:
a processing resource;
a plurality of state registers to store a plurality of user-selected event triggering conditions corresponding to a plurality of threads of instructions to be performed by the processing resource, each of the plurality of state registers having a different priority and to specify a trigger-action mapping for a scenario associated with the state register responsive to which a yield event is to occur to transfer execution to a yield event service routine associated with the state register, wherein the scenario comprises a branch retirement scenario to collect information on branch directions, mispredictions, and path histories;
a profile logic to generate a profile of the plurality of user-selected event triggering conditions according to a user model; and
a profile method logic to translate the profile into a method to optimize user code of at least one of the plurality of threads, wherein the user code is to be modified during run-time to increase likelihood of fall-through targets.

9. The processor of claim 8, wherein each of the plurality of state registers is to further store yield event information to determine whether the occurrence of at least one event triggering condition is to result in a fault-like yield or a trap-like yield.

10. The processor of claim 8, further comprising logic to combine the plurality of user-selected event triggering conditions into at least one scenario.

11. The processor of claim 8, wherein the plurality of threads are to be modified and performed without first recompiling the plurality of threads.

12. A machine-readable non-transitory medium having stored thereon instructions, which if performed by a machine cause the machine to perform a method comprising:

monitoring performance of a processing resource, including detecting a plurality of scenarios occurring within the processing resource, each of the plurality of scenarios corresponding to a user-selected architecturally-defined combination of events that occur on the processor resource and assigned to one of a plurality of channels each programmed to store state information corresponding to an instruction thread, each channel having a different priority and specifying a trigger-action mapping for a scenario associated with the channel responsive to which a yield event is to occur to transfer execution to a yield event service routine associated with the channel, the processing resource further including a block indicator to provide an override of the yield event, wherein if multiple yield events occur simultaneously, a highest priority channel is selected for servicing;

performing a yield in response to detecting the plurality of scenarios;

generating a profile of information from the occurrence of the plurality of scenarios; and optimizing performance of an instruction thread according to the profile of information by translation of the profile of information to modify user code of the instruction thread in real-time during run-time of the instruction thread.

13. The machine-readable non-transitory medium of claim 12, wherein the method further comprises using the profile by a user model to optimize the performance of the instruction thread.

14. The machine-readable non-transitory medium of claim 12, wherein the method further comprises generating the plurality of scenarios from a combination of a plurality of triggering events within the processing resource.

* * * * *